Patented Jan. 9, 1940

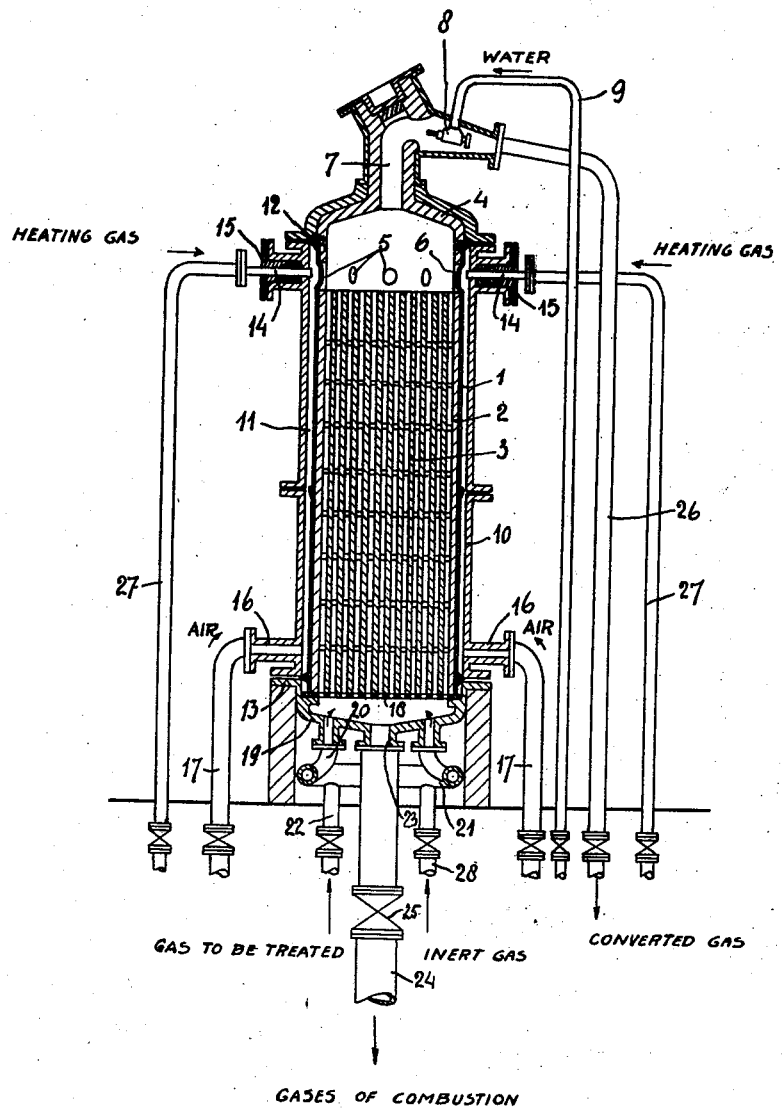

2,186,590

UNITED STATES PATENT OFFICE 2,186,590

PROCESS OF HEAT TREATING GASES

Friedrich Martin, Oberhausen, and Reinhard Jung, Oberhausen-Sterkrade, and Heinrich Tramm, Oberhausen-Holten, Germany, assignors to Ruhrchemie Aktiengesellschaft, Oberhausen-Holten, Germany Application March 27, 1936, Serial No. 71,174
In Germany April 11, 1935

8 Claims. (Cl. 260—668)

Our invention relates to the heat treatment of gases for the purpose of converting same into more valuable products. It has particular reference to means for carrying through chemical reactions in gases by means of the heat accumulated in the reaction zone.

Our invention utilizes the means disclosed in our co-pending application for patent of the United States of America Serial No. 27,688 for "Heat treatment of gases", in which we have disclosed an apparatus which we have found particularly suitable for use in the conversion of hydrocarbons of the methane series and more especially methane itself into acetylene or, with an admixture of ammonia, into hydrocyanic acid.

The oven disclosed in that application is of the heat storer type, being filled with checkerwork which, when heated up by passing through it hot gases of combustion or the like, will accumulate heat which may then be utilized to heat to reaction temperature a gas such as a hydrocarbon (methane), whereby this gas is converted into acetylene or the like.

As explained in the specification of our co-pending application, a heat storer furnace of the kind aforesaid will be suitable for the purpose here in view only, if the checkerwork, or at least that part of the checkerwork, which fills the reaction zone, consists of a practically poreless material, which must of course be of the highly refractory kind, and if the walls of the oven are lined with a similar highly refractory material. We found more particularly an aluminium oxide material prepared by melting aluminium oxide and forming the crushed material together with a binder into bricks or plates burnt at about 1800° C., to be particularly suitable for use as a lining for the oven walls. As further indicated in that specification, we found that this lining should be comparatively thin, measuring from about 30 to 90 millimeters in thickness in order that its mass be kept as low as possible. In order to make up for the rather insufficient insulation afforded by such a thin refractory lining, we provided for a heat insulating jacket in the form of a double shell surrounding the heat storer and for passing a cold gas through the jacket while the oven is heated up.

As checkerwork filling the oven we prefer to employ a material, such as sintered alumina or beryllium oxide or mixtures of the two, which has a smooth surface, is substantially free of pores and contains as little silica and iron as possible. We further found that plates affording straight line passages for the gas are particularly suitable for use in building up the checkerwork filling.

In producing acetylene or hydrocyanic acid in this oven, we accumulated heat by passing through the oven hot gases of combustion or the like and after the oven was thus heated up, we interrupted the supply of hot gas and now sucked the gas or gas mixture to be converted through the oven, at the same time reducing the pressure to about 45 to 50 millimeters mercury column absolute.

We have now found that also reactions not mentioned in our copending application can be carried through with advantage in an oven of the kind aforesaid. In these reactions operation at reduced pressure is not required, the gases to be converted being passed through the zone of accumulated heat substantially under ordinary pressure.

We have for instance found that in operating in this manner, ethane and other hydrocarbons may be converted into ethylene and methane into benzene. We have further found that by passing through the oven at ordinary pressure a mixture of methane and steam, we are enabled to produce water gas.

In all these cases the heating up of the oven for the accumulation of heat in the reaction zone as well as the passing through this zone of accumulated heat, of the gas or gases to be subjected to a conversion reaction, is effected at ordinary pressure. We are led to believe that this favorable result is due to the fact that owing to the smoothness and lack of porosity of the surfaces of the plates constituting the checkerwork and the oven lining any undesirable decompositions of the gases under reaction are avoided. On the other hand, owing to the thin plates forming the oven lining, no quantities of gas worth speaking of are allowed to enter such pores as may still exist in the material, so that decomposition of the gases under reaction within these pores is prevented from taking place. It is to these favorable conditions of operation that we are led to attribute the very favorable yields obtained in this process.

In carrying out the chemical conversion of hydrocarbon gases according to our invention we use with particular advantage an oven such as illustrated diagrammatically by way of example in axial section in the drawing annexed to this specification and forming part thereof.

Referring to the drawing, 1 is the inner metallic shell made from a high grade steel alloy containing, besides iron, from 6–23% chromium, from 0.8–2% aluminium, up to 1% silicon, small percentages of molybdenum and vanadium and less than 0.01% carbon. Steel alloys of this type are sold under the trade name "Sicromal."

2 is the refractory lining covering the inner shell, this lining being composed for instance of 98–99.8% $Al_2O_3$, 1.0–0.1% $SiO_2$, 0.2–0.3% $CaO$ and 0.1–0.4% $Fe_2O_3$. The plates or bricks from which this lining is built up are preferably from 30 to 90 mms. thick.

3 is the checkerwork filling the oven, the plates constituting this checkerwork being for instance composed of about 90% $BeO$, about 9% $Al_2O_3$ and about 1% $SiO_2+Fe_2O_3+CaO+MgO$. 4 is a refractory cap mounted on top of the regenerator and formed with inlet openings 5 for the heating gas registering with similar openings 6 in the inner shell. The cap is formed with a neck 7 serving as an outlet for the reacted gases and 8 is a spray nozzle supplied with water through a pipe 9 and serving to form a veil of cooling water in the path of the hot escaping reaction gases. 10 is the outer pressure resisting shell and 11 is the annular space separating the two shells 1 and 10. The outer shell 10 is packed against the top end of the inner shell by elastic packings 12 and against the bottom end by similar packings 13. 14 are nozzles extending across the outer shell and into the openings 6 of the inner shell, these nozzles being packed by means of stuffing boxes 15 and serving to lead the gas supplied through pipes 27 into the furnace to heat it up. 16 are sockets at the bottom end of the outer shell 10 serving as air inlets connected with the air supply pipes 17, the air entering through these sockets passing through the annular space 11 between the two shells and mixing with the heating gas entering through the nozzles 14, which is then burnt in the oven to heat it up to reaction temperature. 18 is a grate supporting the checkerwork and 19 is the bottom of the oven, from which extend sockets 20 which are connected by a main 21 on the one hand to the pipe 22, which supplies the gas to be treated, and on the other hand to the pipe 28, which supplies inert gases to scavenge the oven. Another socket 23 is connected to the exhaust pipe 24 with valve 25, through which the gases of combustion are withdrawn.

This furnace is first heated under normal pressure to a temperature above 1000° C. by burning the gases introduced through the nozzles 14 with the air introduced at 16, the valve 25 being set to allow the gases of combustion to escape through the pipe 24. On the reaction temperature being reached, the valves in the pipes 17 and 27 are closed and inert gases, such as steam, are introduced through pipe 28 and withdrawn through pipe 24 in order to scavenge the oven and to remove the gases of combustion. Now, instead of the inert gases, the gas mixture to be reacted in the oven is introduced, through the pipe 22, under substantially atmospheric pressure. The converted gas is allowed to escape through pipe line 26. After the temperature of the oven has dropped correspondingly, the introduction of the gas mixture to be treated is stopped and inert gases are once more introduced through the pipe 28; they are now withdrawn through pipe 26. Thereupon the valve in pipe 28 is closed and the valves in the pipes 17 and 27 are once more opened so that the cycle starts afresh.

In the operation of our invention we may for instance proceed as follows:

*Example 1*

Through an oven having an inner diameter of 30 centimeters and heated at the top to 1150° C. methane was introduced in 30 reaction periods per hour, alternating with 30 heating periods, the passage of the gas through the oven being so timed that the gas passed through the hot reaction zone within about 0.2 second. After each reaction period steam was passed through the oven during three seconds in the direction in which the reaction gas has travelled, and similarly after each heating period steam was passed through the oven in the direction of the heating gases, in order to scavenge the gases. The valves were changed over between consecutive periods by means of an automatic oil pressure control. The gases escaping from the oven were cooled by water sprays. The gas mixture escaping from the reaction zone contained about 30 grams benzene formed in the reaction, calculated per cubicmeter of the gas introduced into the oven.

*Example 2*

Through the oven described with reference to Example 1 was passed a gas mixture of the following composition:

| $CO_2$ | $C_2H_4$ | $O_2$ | $CO$ | $H_2$ | $CH_4$ | $N_2$ |
|---|---|---|---|---|---|---|
| 21.3 | 0.7 | 1.0 | 4.6 | 42.6 | 18.2 | 11.6 |

This gas mixture was saturated with steam at 70° C. The passage of the mixture through the oven was so timed that the hot mixture remained in the hot reaction zone about 0.3 second. The top portion of the oven was heated to about 1400° C., the temperature at the bottom was about 300° C. We obtained a gas mixture of the following composition:

| $CO_2$ | $C_2H_2$ | $O_2$ | $CO$ | $H_2$ | $CH_4$ | $N_2$ |
|---|---|---|---|---|---|---|
| 5.3 | 1.2 | 0.3 | 26.2 | 56.4 | 1.8 | 8.8 |

After removal of the acetylene and the carbon dioxide by washing under pressure there remained over a mixture containing mainly CO and $H_2$, which was found suitable for conversion into methyl alcohol or into hydrocarbons of the paraffine series.

Various changes may be made in the details disclosed in the foregoing specification without departing from the invention or sacrificing the advantages thereof.

We claim:

1. The method of chemical conversion of hydrocarbon gases for the recovery of olefinic or aromatic hydrocarbons which comprises passing a hot gas through a checkerwork heat storer formed of a highly refractory substantially non-porous material practically free from silica and iron and having, and retaining at the highest temperature required in the process; a smooth surface so as to build up in the inner part of said heat storer a temperature above 1000° C., scavenging the residual gas by passing through the heat storer an inert gas, thereupon passing through the heated zone under substantially atmospheric pressure the gas to be converted, once more passing scavenging gas through the heat storer and repeating this sequence of operations.

2. The method of claim 1, in which the gas to be converted is ethane.

3. The method of claim 1, in which the gas to be converted is a mixture of $H_2$, $CH_4$, $N_2$ and $CO_2$.

4. The method of claim 1, in which the gas to be converted is methane.

5. The method of claim 1, in which the inert scavenging gas is steam.

6. The method of claim 1 in which the checkerwork of the heat storer consists of sintered alumina.

7. The method of claim 1 in which the checkerwork of the heat storer consists of beryllium oxide.

8. The method of claim 1 in which the checkerwork of the heat storer consists of a mixture of alumina and beryllium oxide.

FRIEDRICH MARTIN.
REINHARD JUNG.
HEINRICH TRAMM.